United States Patent
Anchan

(10) Patent No.: US 9,591,460 B2
(45) Date of Patent: Mar. 7, 2017

(54) APPLICATION LAYER RELATED GROUP PRIORITY ACCESS USING EMBMS AND LTE PRIORITY ACCESS

(71) Applicant: QUALCOMM Incorporated, San Diego, CA (US)

(72) Inventor: Kirankumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/012,905

(22) Filed: Aug. 28, 2013

(65) Prior Publication Data

US 2014/0064176 A1 Mar. 6, 2014

Related U.S. Application Data

(60) Provisional application No. 61/695,787, filed on Aug. 31, 2012.

(51) Int. Cl.
*H04W 4/06* (2009.01)
*H04W 74/00* (2009.01)

(52) U.S. Cl.
CPC .......... *H04W 4/06* (2013.01); *H04W 74/006* (2013.01)

(58) Field of Classification Search
CPC .............................. H04W 4/06; H04W 74/006
See application file for complete search history.

(56) References Cited

U.S. PATENT DOCUMENTS

| 2009/0042587 A1* | 2/2009 | Kamdar | H04W 68/06 455/458 |
| 2009/0042601 A1* | 2/2009 | Wang | H04W 36/0088 455/553.1 |
| 2009/0061863 A1* | 3/2009 | Huggett | H04L 63/101 455/434 |

(Continued)

FOREIGN PATENT DOCUMENTS

| WO | 2012097589 A1 | 7/2012 |
| WO | 2013022474 A1 | 2/2013 |

OTHER PUBLICATIONS

International Search Report and Written Opinion—PCT/US2013/057383—ISA/EPO—Nov. 18, 2013.

*Primary Examiner* — Khaled Kassim
(74) *Attorney, Agent, or Firm* — Muncy, Geissler, Olds & Lowe, P.C.

(57) ABSTRACT

The disclosure relates to dynamically controlling group priority access to a wireless network for a plurality of subscriber devices. An aspect transmits, on a broadcast/multicast interface, a priority group list indicating a priority state of at least one communications group of subscriber devices, wherein a subscriber device is barred from performing channel access procedures when at least one group identifier of the priority group list does not match at least one group identifier of a list of group identifiers of the subscriber device. An aspect receives, on a broadcast/multicast interface, a priority group list indicating a priority state of at least one communications group of subscriber devices, and bars channel access procedures when at least one group identifier of the priority group list does not match at least one group identifier of a list of group identifiers of the subscriber device.

60 Claims, 15 Drawing Sheets

(56) References Cited

U.S. PATENT DOCUMENTS

| | | | |
|---|---|---|---|
| 2010/0248742 A1* | 9/2010 | Song | H04L 12/185 455/456.1 |
| 2011/0199905 A1 | 8/2011 | Pinheiro et al. | |
| 2011/0235558 A1 | 9/2011 | Diachina et al. | |
| 2011/0244907 A1* | 10/2011 | Golaup | H04W 4/005 455/509 |
| 2011/0274040 A1 | 11/2011 | Pani et al. | |
| 2011/0302310 A1 | 12/2011 | Diachina et al. | |
| 2011/0314505 A1* | 12/2011 | Cho | H04N 21/2225 725/62 |
| 2012/0040643 A1* | 2/2012 | Diachina | H04W 4/005 455/411 |
| 2012/0076085 A1* | 3/2012 | Chou | H04W 68/00 370/329 |
| 2012/0207040 A1* | 8/2012 | Comsa | H04W 72/1215 370/252 |
| 2012/0281530 A1 | 11/2012 | Sambhwani et al. | |
| 2013/0063246 A1* | 3/2013 | Kim | G07C 9/00103 340/5.65 |
| 2013/0114506 A1* | 5/2013 | Cai | H04W 4/06 370/328 |
| 2013/0115872 A1* | 5/2013 | Huang | H04W 4/02 455/3.01 |
| 2013/0336179 A1* | 12/2013 | Rubin | H04L 1/1861 370/281 |

* cited by examiner

ND LTE PRIORITY ACCESS
APPLICATION LAYER RELATED GROUP PRIORITY ACCESS USING EMBMS AND LTE PRIORITY ACCESS

CLAIM OF PRIORITY UNDER 35 U.S.C. §119

The present application for patent claims priority to Provisional Application No. 61/695,787, entitled "APPLICATION LAYER RELATED GROUP PRIORITY ACCESS USING EMBMS AND LTE PRIORITY ACCESS," filed Aug. 31, 2012, and assigned to the assignee hereof and hereby expressly incorporated by reference herein.

FIELD OF DISCLOSURE

The present disclosure relates generally to communication, and more specifically to techniques for dynamically controlling access priority to a wireless network for a plurality of subscriber devices for the members of a group call.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services.

Certain push-to-talk (PTT) solutions offer group priority access, thereby improving the chance of high priority group members to access the network by reducing the access channel collision. This is achieved by preventing other low priority users from performing channel access procedures when a select high priority group call is placed. However, generic 3rd Generation Partnership Project (3GPP) or 3GPP2 networks cannot support such application layer group priority.

Long Term Evolution (LTE) networks support access barring by broadcasting the class(es) or categories of subscribers barred from network access on a cell-by-cell basis, as indicated in a System Information Block (SIB) message. UEs are provisioned with one or more access classes, and if at least one access class on the UE is permitted access based on the SIB message, the UE is allowed to perform access attempts. The typical use of access class-based barring is to categorize users into two ranges: the range that is barred from access and the remaining set that is allowed access.

This access barring is not group specific, however, and affects all of the users in a particular access class of UE calls. Moreover, LTE access barring is not dynamic, i.e., operator intervention is required to change the access barring information in the SIB message. Further, the access barring lasts even after the high priority user has completed access and bearer assignment.

SUMMARY

The disclosure relates to dynamically controlling access priority to a wireless network for a plurality of subscriber devices for the members of a group call. A method for dynamically controlling access priority to a wireless network for a plurality of subscriber devices for the members of a group call includes transmitting, on a broadcast/multicast interface, a priority group list indicating a priority state of at least one communications group of subscriber devices, wherein a communications group of subscriber devices comprises a group of subscribers that are associated with each other, and wherein a subscriber device is barred from performing channel access procedures when at least one group identifier of the priority group list does not match at least one group identifier of a list of group identifiers of the subscriber device.

A method for determining priority access to a wireless network at a subscriber device for a group call includes receiving, on a broadcast/multicast interface, a priority group list indicating a priority state of at least one communications group of subscriber devices, wherein a communications group of subscriber devices comprises a group of subscribers that are associated with each other, and barring channel access procedures when at least one group identifier of the priority group list does not match at least one group identifier of a list of group identifiers of the subscriber device.

An apparatus for dynamically controlling access priority to a wireless network for a plurality of subscriber devices for the members of a group call includes logic configured to transmit, on a broadcast/multicast interface, a priority group list indicating a priority state of at least one communications group of subscriber devices, wherein a communications group of subscriber devices comprises a group of subscribers that are associated with each other, and wherein a subscriber device is barred from performing channel access procedures when at least one group identifier of the priority group list does not match at least one group identifier of a list of group identifiers of the subscriber device.

An apparatus for determining priority access to a wireless network at a subscriber device for a group call includes logic configured to receive, on a broadcast/multicast interface, a priority group list indicating a priority state of at least one communications group of subscriber devices, wherein a communications group of subscriber devices comprises a group of subscribers that are associated with each other, and logic configured to bar channel access procedures when at least one group identifier of the priority group list does not match at least one group identifier of a list of group identifiers of the subscriber device.

An apparatus for dynamically controlling access priority to a wireless network for a plurality of subscriber devices for the members of a group call includes means for transmitting, on a broadcast/multicast interface, a priority group list indicating a priority state of at least one communications group of subscriber devices, wherein a communications group of subscriber devices comprises a group of subscribers that are associated with each other, and wherein a subscriber device is barred from performing channel access procedures when at least one group identifier of the priority group list does not match at least one group identifier of a list of group identifiers of the subscriber device.

An apparatus for determining priority access to a wireless network at a subscriber device for a group call includes means for receiving, on a broadcast/multicast interface, a priority group list indicating a priority state of at least one communications group of subscriber devices, wherein a communications group of subscriber devices comprises a group of subscribers that are associated with each other, and means for barring channel access procedures when at least one group identifier of the priority group list does not match at least one group identifier of a list of group identifiers of the subscriber device.

A non-transitory computer-readable medium for dynamically controlling access priority to a wireless network for a plurality of subscriber devices for the members of a group call includes at least one instruction to transmit, on a broadcast/multicast interface, a priority group list indicating a priority state of at least one communications group of subscriber devices, wherein a communications group of subscriber devices comprises a group of subscribers that are associated with each other, and wherein a subscriber device is barred from performing channel access procedures when at least one group identifier of the priority group list does not match at least one group identifier of a list of group identifiers of the subscriber device.

A non-transitory computer-readable medium for determining priority access to a wireless network at a subscriber device for a group call includes at least one instruction to receive, on a broadcast/multicast interface, a priority group list indicating a priority state of at least one communications group of subscriber devices, wherein a communications group of subscriber devices comprises a group of subscribers that are associated with each other, and at least one instruction to bar channel access procedures when at least one group identifier of the priority group list does not match at least one group identifier of a list of group identifiers of the subscriber device.

BRIEF DESCRIPTION OF THE DRAWINGS

The accompanying drawings are presented to aid in the description of the various aspects of the disclosure and are provided solely for illustration of the aspects of the disclosure and not limitation thereof.

DETAILED DESCRIPTION

Figure 1:
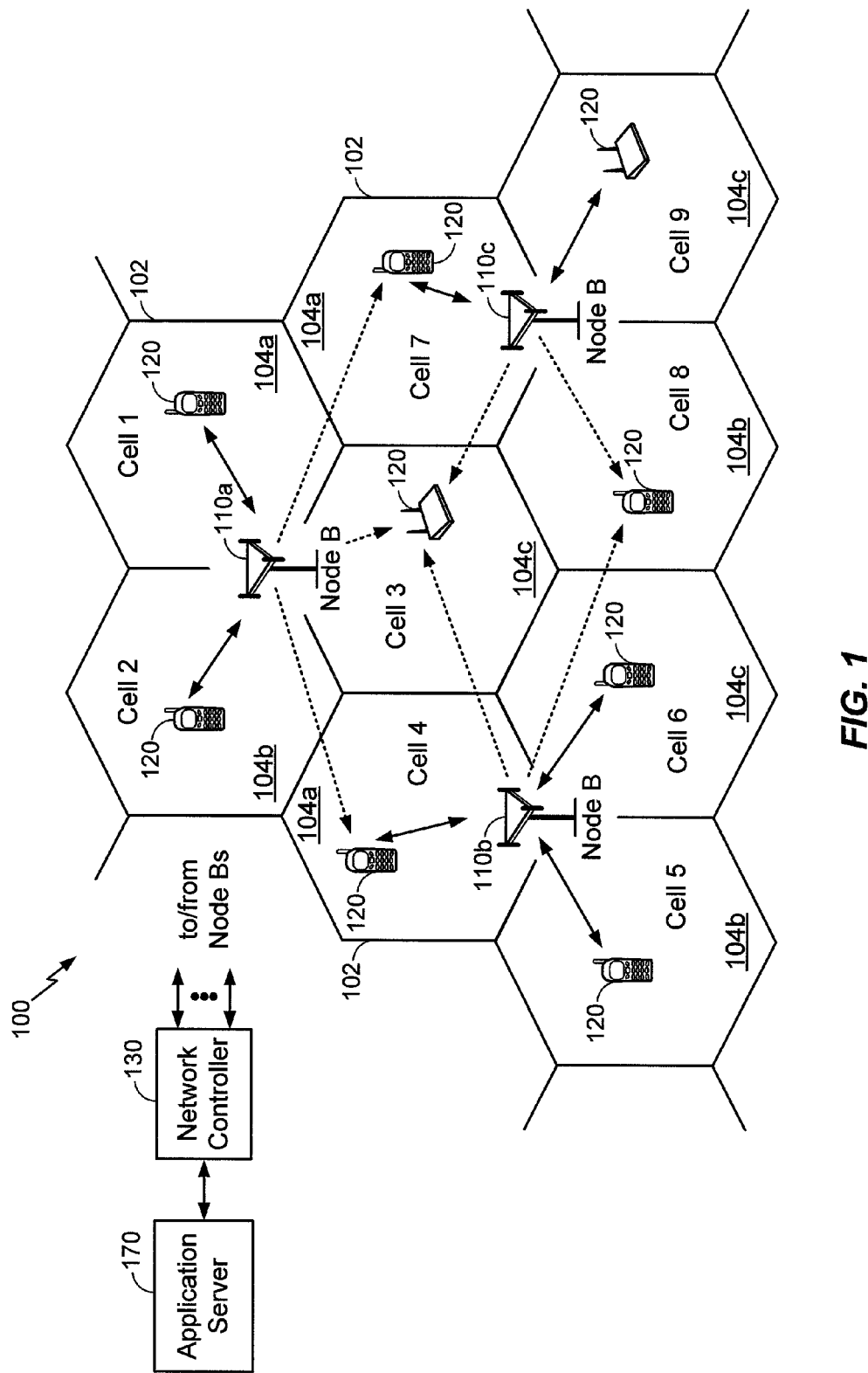
FIG. 1 illustrates a wireless communication system.

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation. Further, as used herein the term group communication, push-to-talk, or similar variations are meant to refer to a server arbitrated service between two or more devices.

The terminology used herein is for the purpose of describing particular aspects only and is not intended to be limiting of aspects of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Cellular communication system 100 may also include other network entities not shown in FIG. 1. Further, as illustrated network controller may be operably coupled to an application server 170 to provide group communication services to the various UEs 120 through the system 100. It will be appreciated that there can be many other network and system entities that can be used to facilitate communications between the UEs and servers and information outside of the access network. Accordingly, the various aspects disclosed herein are not limited to the specific arrangement or elements detailed in the various figures.

Figure 2:
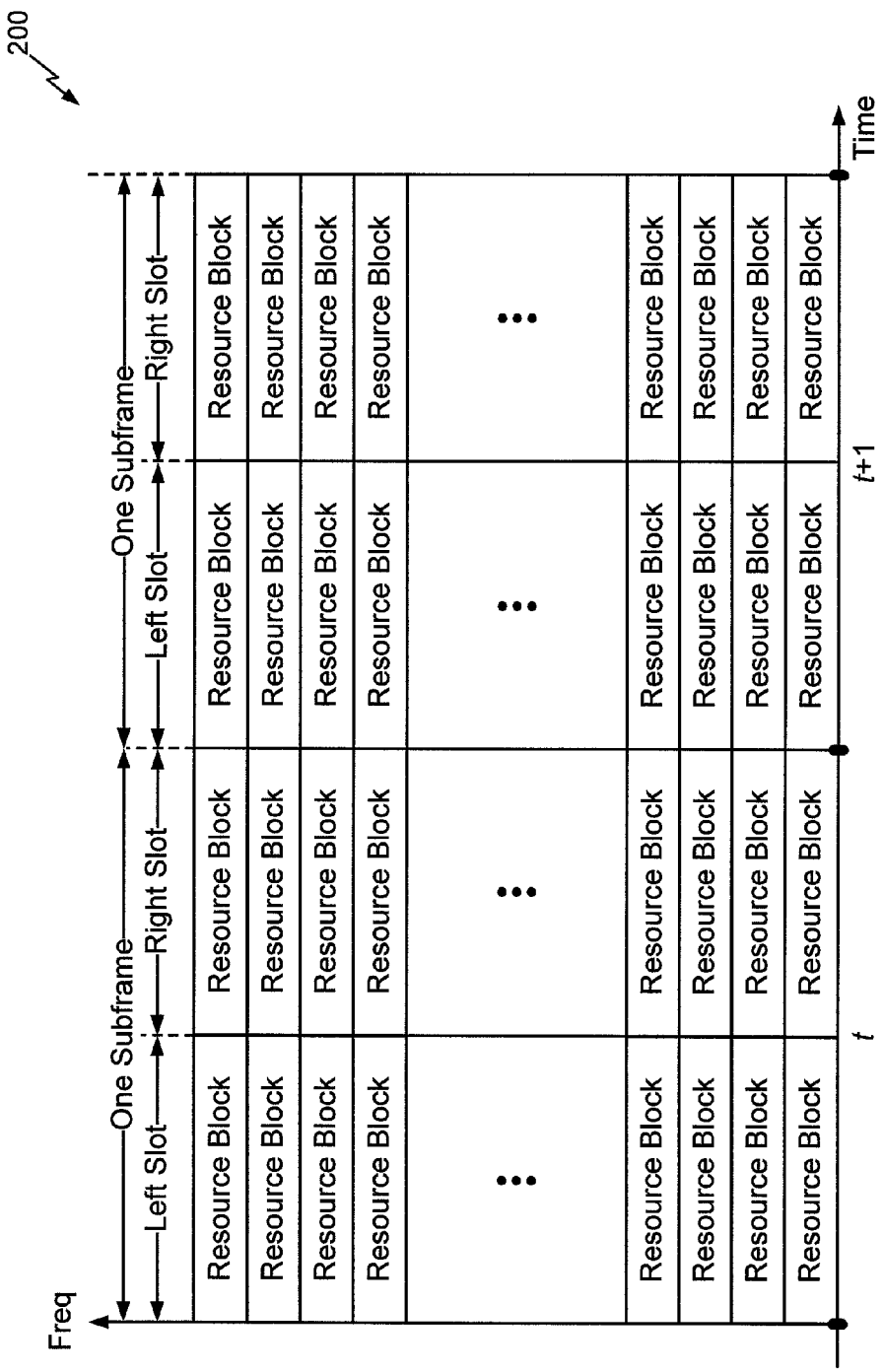
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:

Content for broadcast or multicast services can be transmitted synchronously across multiple cells.

Radio resources for broadcast and multicast services are allocated by an MBMS Coordinating Entity (MCE), which may be logically located above the Node Bs.

Content for broadcast and multicast services is mapped on the MCH at a Node B.

Time division multiplexing (e.g., at sub frame level) of data for broadcast, multicast, and unicast services.

The single-cell mode may have the following characteristics:

Each cell transmits content for broadcast and multicast services without synchronization with other cells.

Radio resources for broadcast and multicast services are allocated by the Node B.

Content for broadcast and multicast services is mapped on the DL-SCH.

Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3A:
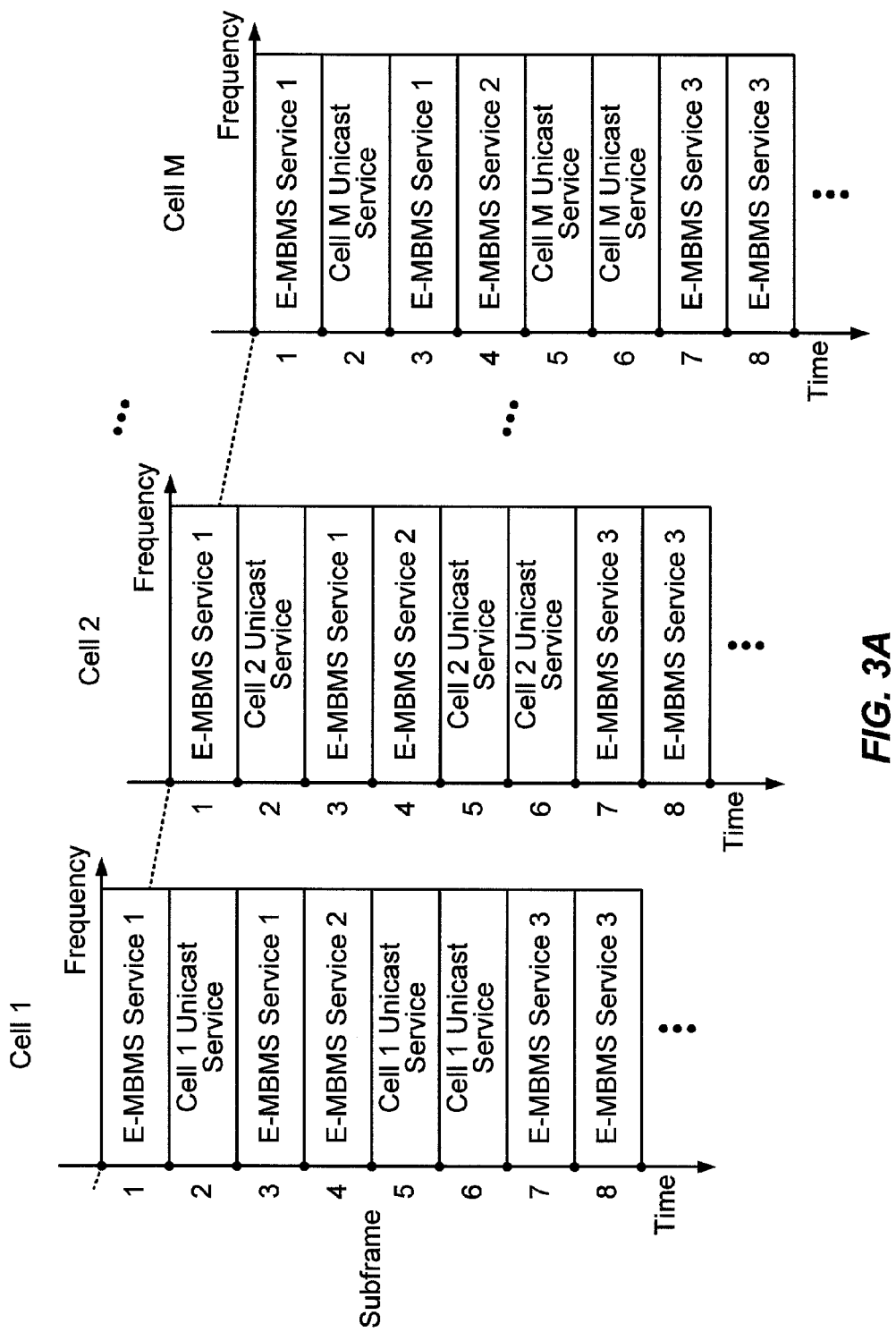
FIG. 3A illustrates example transmissions of different services in a multi-cell mode.

FIG. 3A shows example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub frames. In other designs of eMBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3A, the M cells transmit three eMBMS services 1, 2 and 3. All M cells transmit eMBMS service 1 in sub frames 1 and 3, eMBMS service 2 in sub frame 4, and eMBMS service 3 in sub frames 7 and 8. The M cells transmit the same content for each of the three eMBMS services. Each cell may transmit its own unicast service in sub frames 2, 5 and 6. The M cells may transmit different contents for their unicast services.

Figure 3B:
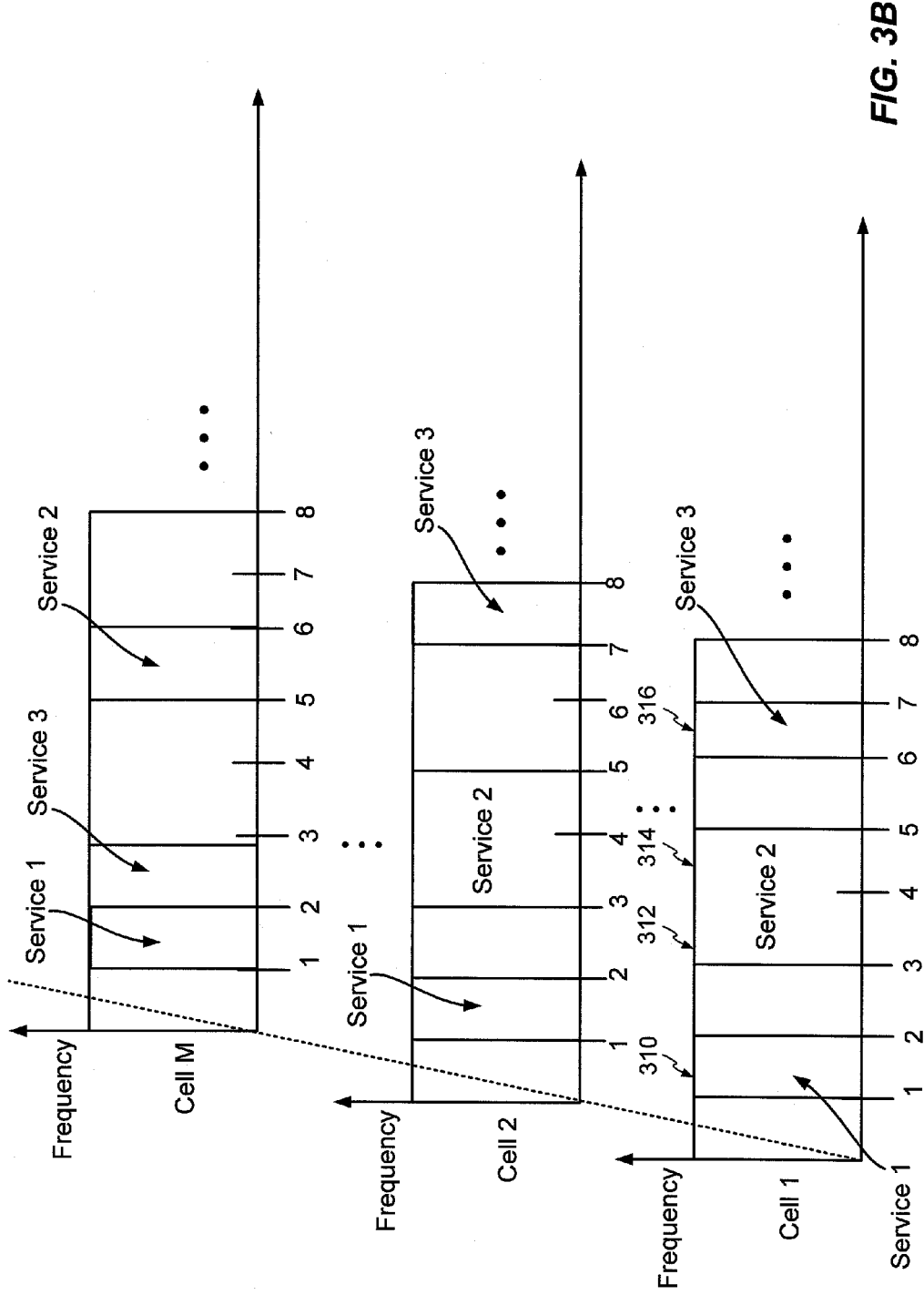
FIG. 3B illustrates example transmissions of different services in a single-cell mode.

FIG. 3B shows example transmissions of eMBMS and unicast services by M cells in the single-cell mode. For each cell, the horizontal axis may represent time, and the vertical axis may represent frequency. In the example shown in FIG. 3B, the M cells transmit three eMBMS services 1, 2 and 3. Cell 1 transmits eMBMS service 1 in one time frequency block 310, eMBMS service 2 in a time frequency blocks 312 and 314, and eMBMS service 3 in one time frequency blocks 316. Similarly other cells transmit services 1, 2 and 3 as shown in the FIG. 3B.

In general, an eMBMS service may be sent in any number of time frequency blocks. The number of sub frames may be dependent on the amount of data to send and possibly other factors. The M cells may transmit the three eMBMS services 1, 2 and 3 in time frequency blocks that may not be aligned in time and frequency, as shown in FIG. 3B. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3A and 3B show example designs of transmitting eMBMS services in the multi-cell mode and the single-cell mode. eMBMS services may also be transmitted in other manners in the multi-cell and single-cell modes, e.g., using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 4:
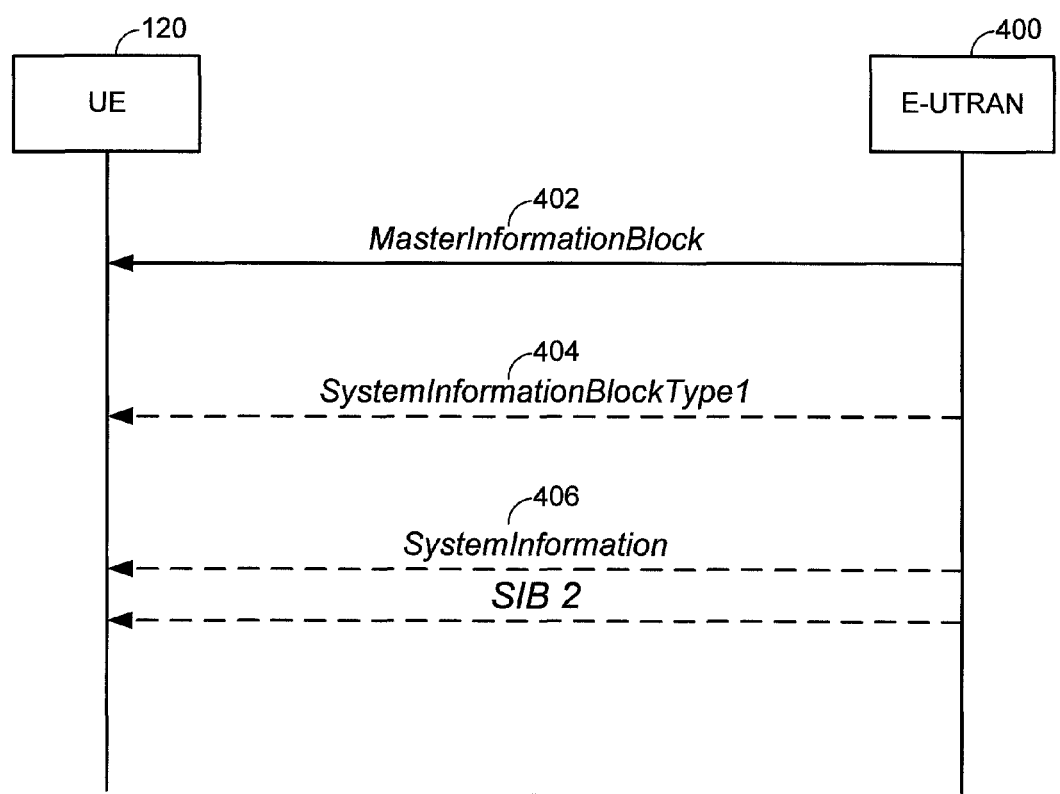
FIG. 4 illustrates an exemplary communication between a user equipment (UE) and an evolved universal terrestrial radio access network (E-UTRAN).

Referring to FIG. 4, system information is provided by radio resource control (RRC), and is structured in master information blocks (MIBs) and system information blocks (SIBs). An MIB 402 is transmitted in fixed location time slots and includes parameters to aid the UE 120 in locating a SIB Type 1 (SIB1) 404 scheduled on the DL-SCH (e.g., DL bandwidth and system frame number). The SIB1 404 contains information relevant to scheduling the other system information and information on access to a cell. The other SIBs are multiplexed in system information messages. A SIB Type 2 (SIB2) message 406 contains resource configuration information that is common to all UEs 120 and information on access barring. The evolved universal terrestrial RAN (E-UTRAN) 400 controls user access by broadcasting access class barring parameters in a SIB2 message 406, and the UE 120 performs actions according to the access class in its universal subscriber identity module (USIM).

All UEs that are members of access classes one to ten are randomly allocated mobile populations, defined as access classes 0 to 9. The population number is stored in the SIM/USIM. In addition, UEs may be members of one or more of five special categories (access classes 11 to 15) also held in the SIM/USIM. The standard defines these access classes as follows (3GPP TS 22.011, Section 4.2):
Class 15—PLMN Staff;
Class 14—Emergency Services;
Class 13—Public Utilities (e.g. water/gas suppliers);
Class 12—Security Services; and
Class 11—For PLMN Use.

A SIB2 message contains the following parameters for access control:
For regular users with Access Class 0 to 9, the access is controlled by ac-BarringFactor and ac-BarringTime parameters in the SIB2 message.
For users initiating emergency calls (AC 10) the access is controlled by the ac-BarringForEmergency parameter, indicating whether access barring is enforced or not enforced.
For UEs with AC 11 to 15, the access is controlled by the ac-BarringForSpecialAC—parameter, indicating whether access barring is enforced or not enforced.

A UE is allowed to perform access procedures when the UE is a member of at least one access class that corresponds to the permitted classes as signaled over the air interface.

The UEs generate a random number to pass the "persistent" test in order for the UE to gain access. To gain access, a UE random number generator's outcome needs to be lower than the threshold set in the ac-BarringFactor. By setting the ac-BarringFactor to a lower value, the access from regular users is restricted. The users with access class 11 to 15 can gain access without any restriction.

Figure 5A:
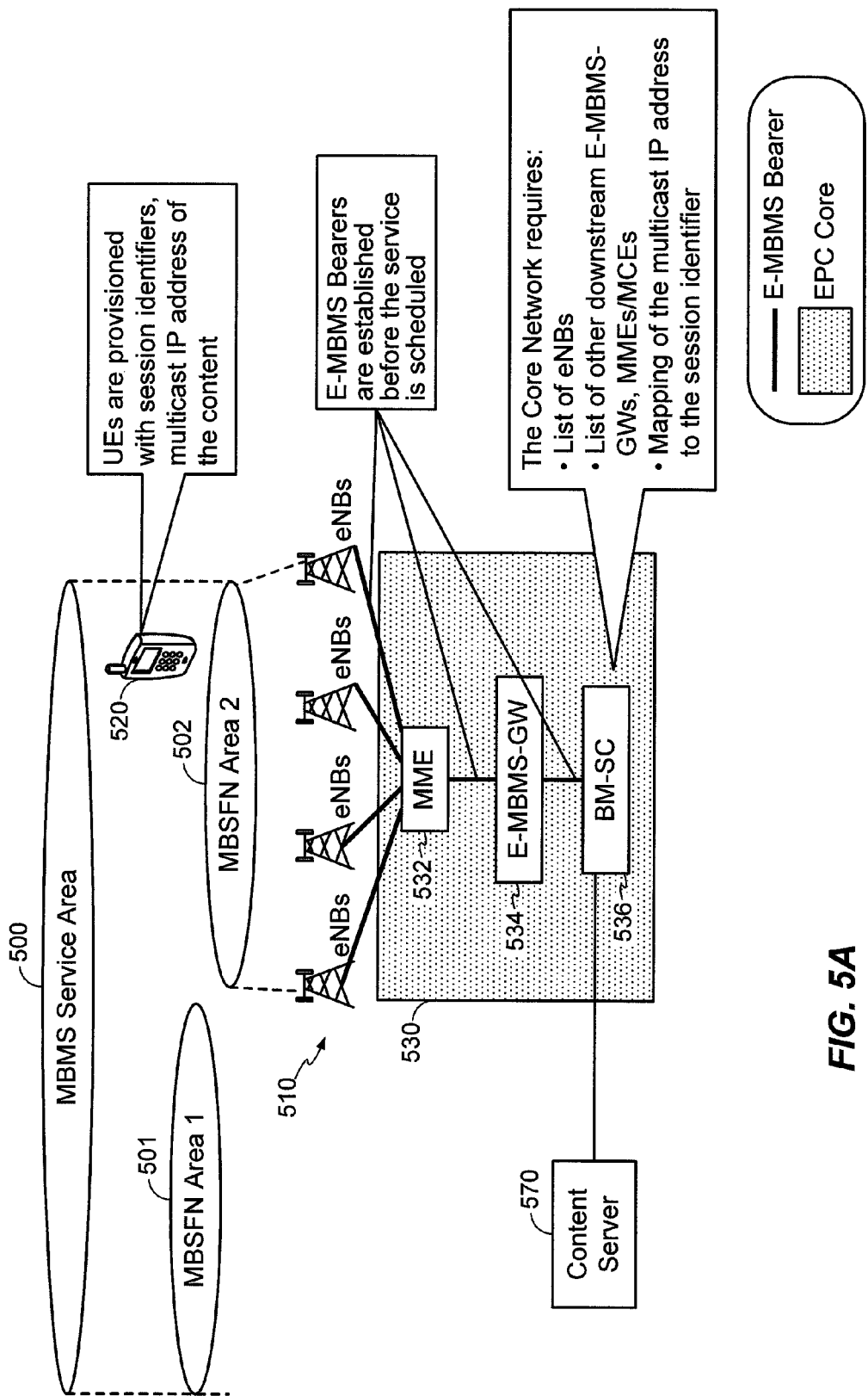
FIGS. 5A and 5B illustrate additional wireless communication systems that can support broadcast/multicast services.

FIG. 5A is another illustration of a wireless network that can implement evolved multimedia broadcast/multicast services (eMBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, eMBMS gateway 534, and broadcast multicast service center (BM-SC) 536 to facilitate controlling and distributing the content from content provider 570 (which may include an application server, such as application server 170, etc.) to the MBMS service area 500. The core network 530 may require a list of eNode Bs within the network, list of other downstream E-MBMS-GWs 534, and (Mobility Management Entity) MMEs/MCEs 532, and a mapping of the multicast IP address to the session identifier. UE 520 within the network can be provisioned with session identifiers and multicast IP address of the content sent to it. Typically an MME is a key control node for the LTE access network. It is responsible for idle mode UE tracking and paging procedure including retransmissions. It is involved in the bearer activation/deactivation process and is also responsible for choosing the SGW for a UE at the initial attach and at time of intra-LTE handover involving core network 530 node relocation and the MME is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME also provides the control plane function for mobility between LTE and 2G/3G access networks with S3 interface terminating at the MME.

Figure 5B:
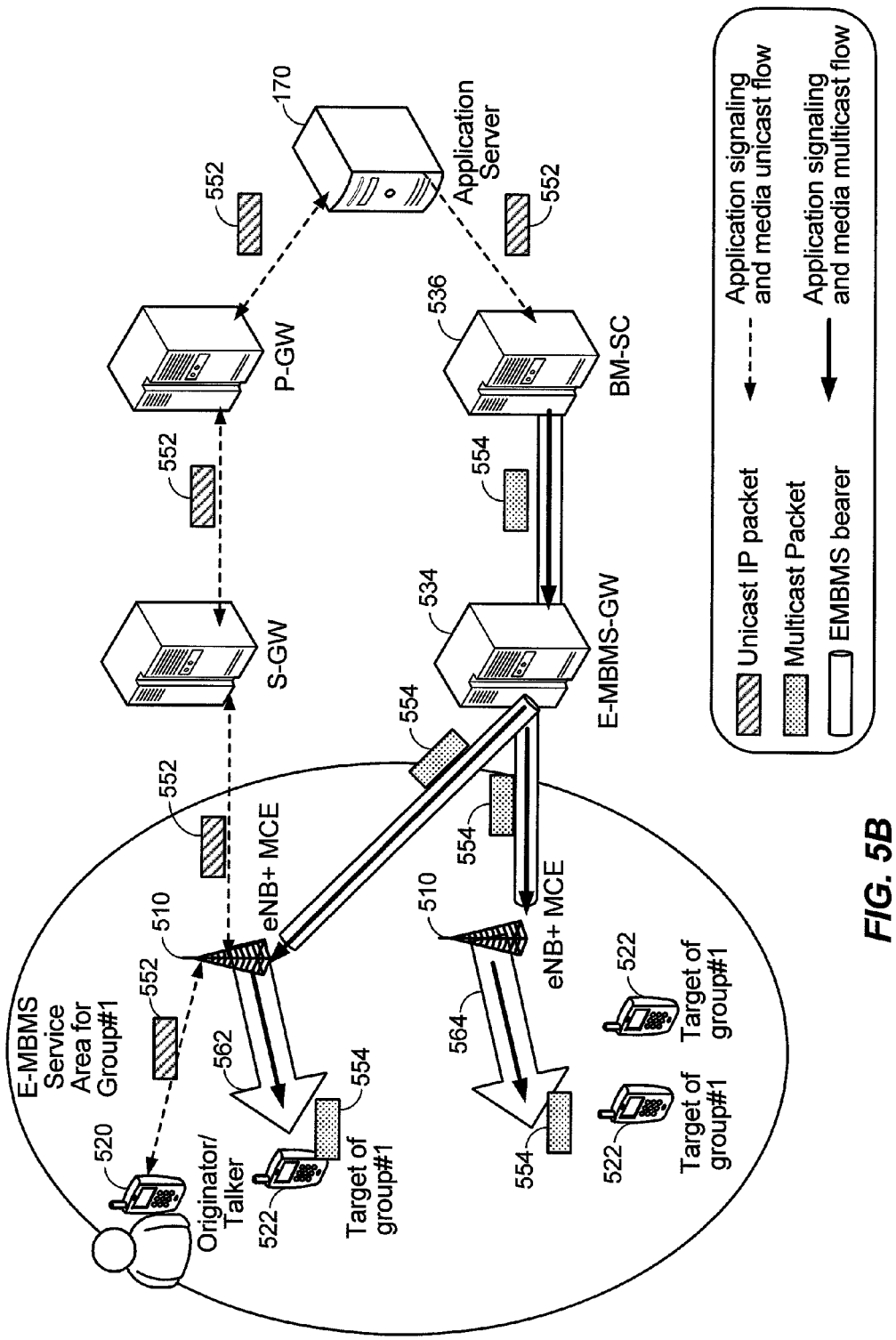

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved. packet system (EPS) bearer will be established (and persistently on) between the BM-SC 536, EMBS GW 534, eNBs 510 and target UEs 522.

In accordance with various aspects disclosed herein some of the downlink channels related to eMBMS will be further discussed, which include.
MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block.

In LTE, the control and data traffic for multicast is delivered over MCCH and MTCH, respectively. The Medium Access Control Protocol Data Units (MAC PDUs) for the UEs indicate the mapping of the MTCH and the location of the particular MTCH within a sub frame. An MCH Scheduling Information (MSI) MAC control element is included in the first subframe allocated to the MCH within the MCH scheduling period to indicate the position of each MTCH and unused subframes on the MCH. For eMBMS user data, which is carried by the MTCH logical channel, MSI periodically provides at lower layers (e.g., MAC layer information) the information on decoding the MTCH. The MSI scheduling can be configured and, according to this aspect, is scheduled prior to the MTCH sub-frame interval.

To achieve low latency and reduce control signaling, one eMBMS flow (e.g., 562, 564 of FIG. 5B) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Aspects of the disclosure can use two broadcast streams, each a separate eMBMS flow over an LTE broadcast flow, with its own application level broadcast stream and its own (multicast IP address) for each defined broadcast region (e.g., a subset of sectors within the network). These regions may be separate, or they may overlap.

Figure 6:
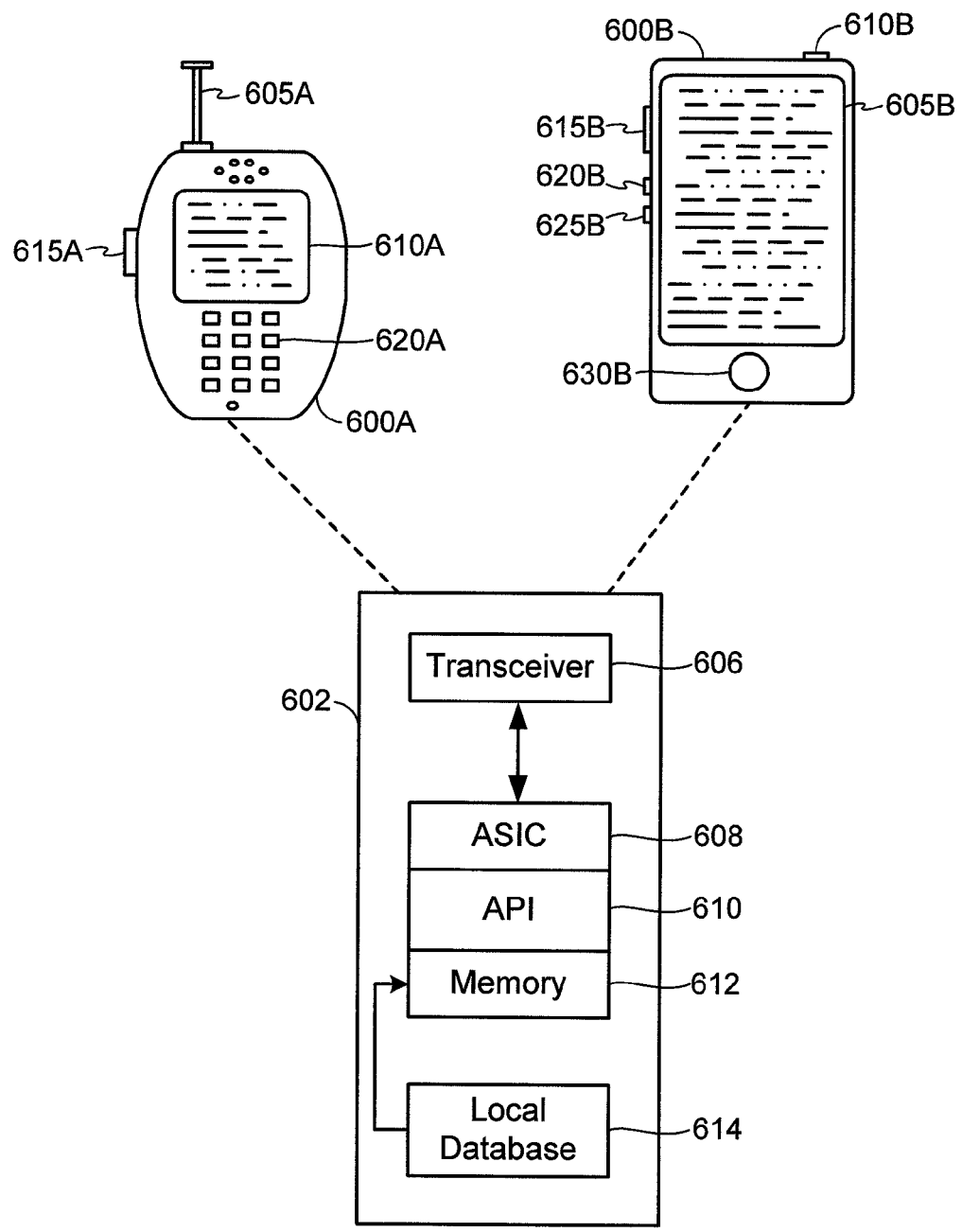
FIG. 6 illustrates examples of user equipments (UEs) in accordance with aspects of the disclosure.

FIG. 6 illustrates examples of UEs in accordance with aspects of the disclosure. Referring to FIG. 6, UE 600A is illustrated as a calling telephone and UE 600B is illustrated as a touchscreen device (e.g., a smart phone, a tablet computer, etc.). As shown in FIG. 6, an external casing of UE 600A is configured with an antenna 605A, display 610A, at least one button 615A (e.g., a PTT button, a power button, a volume control button, etc.) and a keypad 620A among other components, as is known in the art. Also, an external casing of UE 600B is configured with a touchscreen display 605B, peripheral buttons 610B, 615B, 620B and 625B (e.g., a power control button, a volume or vibrate control button, an airplane mode toggle button, etc.), at least one front-panel button 630B (e.g., a Home button, etc.), among other components, as is known in the art. While not shown explicitly as part of UE 600B, the UE 600B can include one or more external antennas and/or one or more integrated antennas that are built into the external casing of UE 600B, including but not limited to WiFi antennas, cellular antennas, satellite position system (SPS) antennas (e.g., global positioning system (GPS) antennas), and so on.

While internal components of UEs such as the UEs 600A and 600B can be embodied with different hardware configurations, a basic high-level UE configuration for internal hardware components is shown as platform 602 in FIG. 6. The platform 602 can receive and execute software applications, data and/or commands transmitted from the Node B(s) 110 that may ultimately come from the core network, the Internet and/or other remote servers and networks (e.g., application server 170, web URLs, etc.). The platform 602 can also independently execute locally stored applications without RAN interaction. The platform 602 can include a transceiver 606 operably coupled to an application specific integrated circuit (ASIC) 608, or other processor, microprocessor, logic circuit, or other data processing device. The ASIC 608 or other processor executes the application programming interface (API) 610 layer that interfaces with any resident programs in the memory 612 of the wireless device. The memory 612 can be comprised of read-only memory (ROM) or random-access memory (RAM), electrically erasable programmable ROM (EEPROM), flash cards, or any memory common to computer platforms. The platform 602 also can include a local database 614 that can store applications not actively used in memory 612, as well as other data. The local database 614 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 600A, 600B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 608, memory 612, API 610 and local database 614 may all be used cooperatively to load, store and execute the various functions disclosed herein and thus the logic to perform these functions may be distributed over various elements. Alternatively, the functionality could be incorporated into one discrete component. Therefore, the features of the UEs 600A and 600B in FIG. 6 are to be considered merely illustrative and the disclosure is not limited to the illustrated features or arrangement.

The wireless communication between the UEs 600A and/or 600B and the Node B(s) 110 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 7:
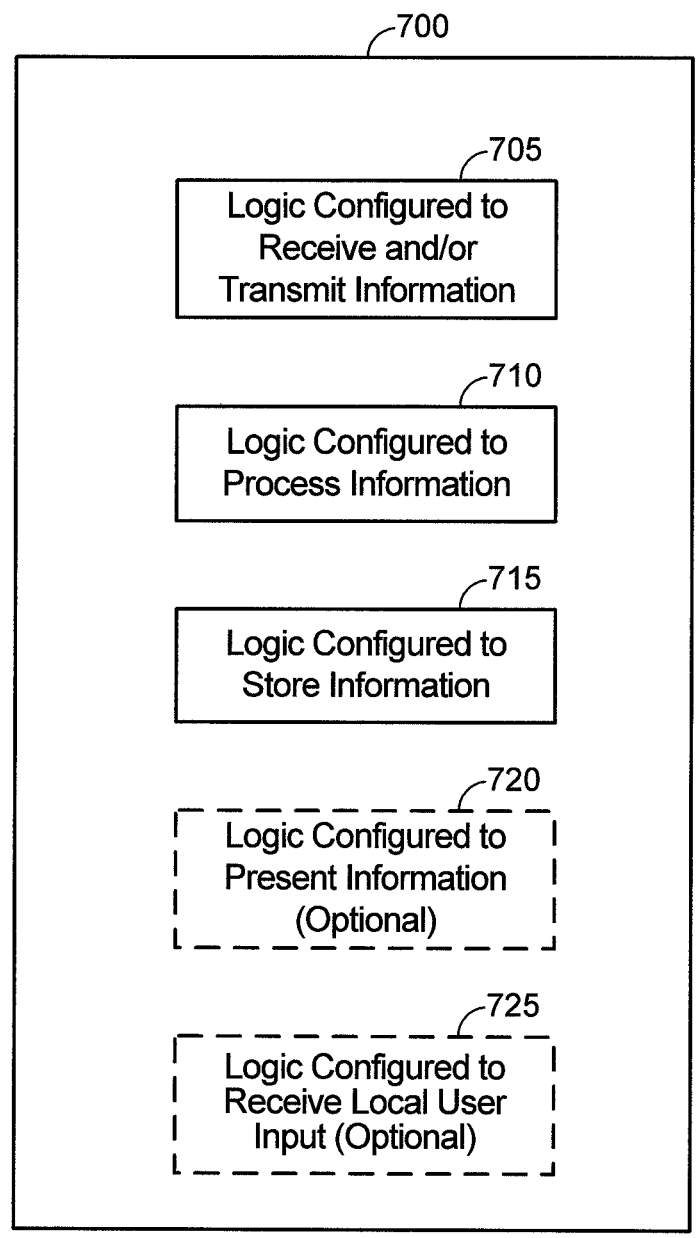
FIG. 7 illustrates a communication device that includes logic configured to perform functionality.

FIG. 7 illustrates a communication device 700 that includes logic configured to perform functionality. The communication device 700 can correspond to any of the above-noted communication devices, including but not limited to UEs 120, 600A, 600B, Node Bs or base stations 110, the RNC or network controller 130, a packet data network end-point (e.g., SGSN, GGSN, a Mobility Management Entity (MME) in LTE, etc.), application server 170, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, UE 300A, UE 300B, Node B 110, etc.), the logic configured to receive and/or transmit information 705 can include a wireless communications interface (e.g., Bluetooth, WiFi, 2G, 3G, 4G, LTE, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., application server 170, etc.), the logic configured to receive and/or transmit information 705 can correspond to an Ethernet card, in an example, that connects the network-based server to other communication entities via an Ethernet protocol. In an example, the logic configured to receive and/or transmit information 705 can include logic configured to transmit, on a broadcast/multicast interface, a priority group list indicating a priority state of at least one communications group of subscriber devices, wherein a communications group of subscriber devices comprises a group of subscribers that are associated with each other, and wherein a subscriber device is barred from performing channel access procedures when at least one group identifier of the priority group list does not match at least one group identifier of a list of group identifiers of the subscriber device. The logic configured to receive and/or transmit information 705 can also include logic configured to receive, on a broadcast/multicast interface, a priority group list indicating a priority state of at least one communications group of subscriber devices, wherein a communications group of subscriber devices comprises a group of subscribers that are associated with each other and/or logic configured to bar channel access procedures when at least one group identifier of the priority group list does not match at least one group identifier of a list of group identifiers of the subscriber device. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the logic configured to process information 710 can include logic configured to bar channel access procedures when at least one group identifier of the priority group list does not match at least one group identifier of a list of group identifiers of the subscriber device. The processor included in the logic configured to process information 710 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM memory, flash memory, ROM memory, EPROM memory, EEPROM memory, registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to present information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 600A or UE 600B as shown in FIG. 6, the logic configured to present information 720 can include the display 610A of UE 600A or the touchscreen display 605B of UE 600B. In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 600A or UE 600B as shown in FIG. 6, the logic configured to receive local user input 725 can include the keypad 620A, any of the buttons 615A or 610B through 625B, the touchscreen display 605B, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic."

Figure 8:
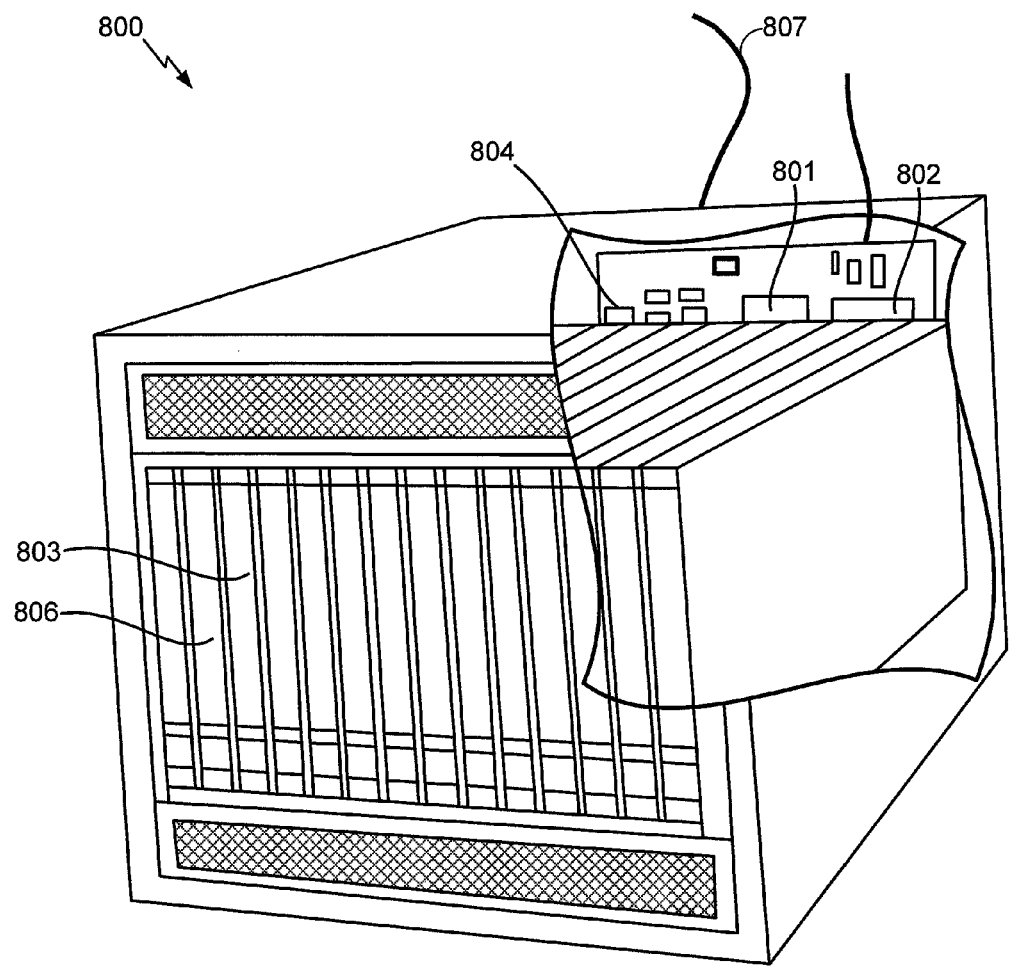
FIG. 8 illustrates an exemplary server according to various aspects of the disclosure.

The various aspects of the disclosure may be implemented on any of a variety of commercially available server devices, such as server 800 illustrated in FIG. 8. In an example, the server 800 may correspond to one example configuration of the application server 170 described above. In FIG. 8, the server 800 includes a processor 800 coupled to volatile memory 802 and a large capacity nonvolatile memory, such as a disk drive 803. The server 800 may also include a floppy disc drive, compact disc (CD) or DVD disc drive 806 coupled to the processor 801. The server 800 may also include network access ports 804 coupled to the processor 801 for establishing data connections with a network 807, such as a local area network coupled to other broadcast system computers and servers or to the Internet. In context with FIG. 7, it will be appreciated that the server 800 of FIG. 8 illustrates one example implementation of the communication device 700, whereby the logic configured to transmit and/or receive information 705 corresponds to the network access points 804 used by the server 800 to communicate with the network 807, the logic configured to process information 710 corresponds to the processor 801, and the logic configuration to store information 715 corresponds to any combination of the volatile memory 802, the disk drive 803 and/or the disc drive 806. The optional logic configured to present information 720 and the optional logic configured to receive local user input 725 are not shown explicitly in FIG. 8 and may or may not be included therein. Thus, FIG. 8 helps to demonstrate that the communication device 700 may be implemented as a server, in addition to a UE implementation as in 605A or 605B as in FIG. 6.

Certain PTT solutions offer group priority access, thereby improving the chance of high priority group members to access the network by reducing the access channel collision. This is achieved by preventing other low priority users from performing channel access procedures when a select high priority group call is placed. However, generic 3GPP or 3GPP2 networks cannot support such application layer group priority.

LTE networks support access barring in two categories, depending on the class of the UE. However, this access barring is not group specific and affects all of the users in a particular band of UE calls. Moreover, LTE access barring is not dynamic, i.e., operator intervention is required to change the access barring information in the System Information Block SIB message. Further, the access barring lasts even after the high priority user has completed access and bearer assignment.

The various aspects of the disclosure provide group priority access over LTE and a dynamic mechanism to control access barring.

To enable group priority access, the various aspects use an overlay eMBMS network and a logical eMBMS resource to periodically broadcast a "priority channel bitmask" that indicates the presence of a high priority group call. Each bit in the bitmask identifies a different group. The application server controls the data on the priority channel bitmask. When a priority group call is being started, the application server sets the bit assigned to the group in the priority channel bitmask to 1. When the call setup is complete, the application server resets the bit to 0.

All UEs are provisioned with information to access the priority channel bitmask and a mapping of the bitmask to the group identifiers. A UE determines that a high priority call is being setup if a bit in the priority channel bitmask has been set to 1. The UE determines whether or not it is part of the group based on the mapping of the bitmask to the group identifiers. If the UE is a part of the group, it is allowed to perform access. If the UE is not part of the group, its access is barred until the priority channel bitmask changes, i.e., the high priority group call has been setup.

This provides a number of benefits. Among them, group priority can be achieved on standard 3GPP and 3GPP2 networks based on application layer signaling. Additionally, the access barring categories allow finer granularity of control. Moreover, the dynamic access barring scheme allows faster implementation of access barring without operator intervention. Further, the access barring lasts only until the high priority group members have completed their access and bearer assignments, thus freeing up the network for other users.

Apart from the high priority indicator, the priority access channel can also indicate certain priority levels. The priority level can be pre-assigned to the groups at the application server, allowed as an input from the user when the call is made, or a combination of both.

Figure 9:
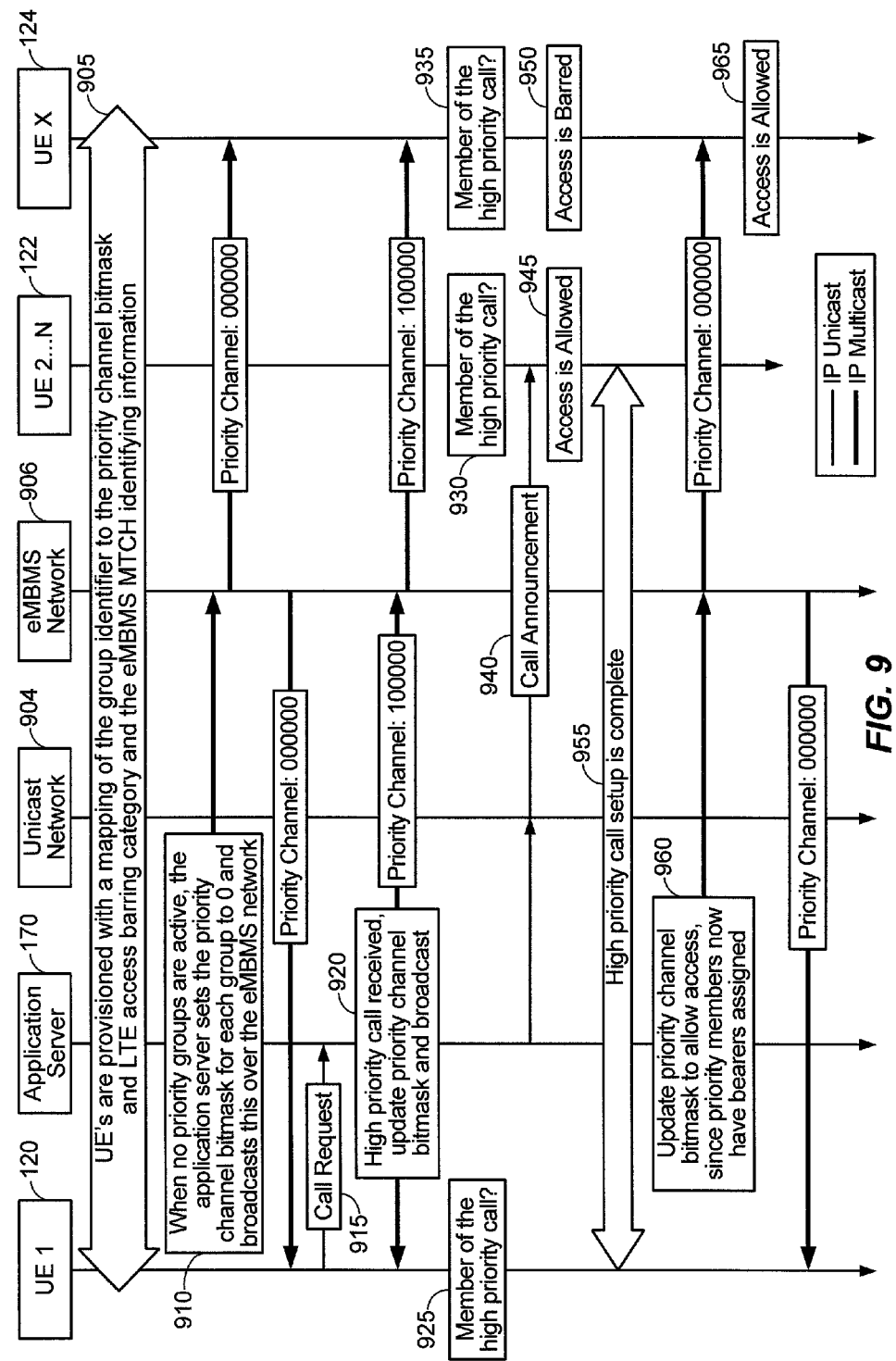
FIG. 9 illustrates an exemplary flow of an aspect of the disclosure.

For example, the UE access barring can be classified into levels as follows:
  Highest
  UE with LTE access class 12 or higher
  UEs belonging to the groups advertised in the bitmask are
     allowed access
  Higher
  UE with LTE access class 10 or higher
  UEs belonging to the groups advertised in the bitmask are
     allowed access
  High
  UE with LTE access class 7 or higher
  UEs belonging to the groups advertised in the bitmask are
     allowed access FIG. 9 illustrates an exemplary flow of an aspect of the disclosure. Specifically, FIG. 9 illustrates the interactions of UEs 1 to N and X (represented as 120, 122, and 124, respectively), the application server 170, a unicast network 904, and an eMBMS network 906. The application server 170 (e.g., a PTT server) can communicate media in unicast packets on the unicast network 904, where the content can be maintained in a unicast configuration and transmitted as unicast packets to a given UE, or can convert the unicast packets through the BM-SC to multicast packets, which can then be transported to target UE's on the multicast network 906.

At 905, UEs are provisioned with the MTCH information for monitoring the priority channel bitmask, the mapping of the bitmask to the group identifiers, and the LTE access barring class. At 910, because no priority groups are active, the application server 170 sets the priority channel bitmask for each group to 0 and broadcasts it as multicast packet data over the eMBMS network 1006 on the MTCH.

At 915, UE 1 120 sends a high priority call request to the application server 170 over a unicast channel. It will be noted that for the call originator/talker 120, both the application signaling and media are communicated via the unicast channel on the uplink or the reverse link. At 920, the application server 170 receives the call request and updates the priority channel bitmask by changing the bit representing the group to which originator/talker 120 belongs from 0 to 1. The application server 170 then broadcasts the updated bitmask over the MTCH. The application server 170 may broadcast the updated priority channel bitmask immediately or at the next scheduled periodic interval.

At 925, UE 1 120 determines whether or not it is a member of the high priority call. Likewise, at 930 and 935, UEs 2 to N 122 and X 124 determine whether or not they are members of the high priority call. In the example of FIG. 9, UE 1 120 and UEs 2 to N 122 are members of the high priority call while UE X 124 is not.

At 940, the application server 170 sends a call announcement/call setup request to the target UEs 2 to N 122 but not UE X 124. The communication can be communicated to the target UEs 2 to N 122 via multicast packets over a multicast flow, as illustrated in the example of FIG. 9.

At 945, UEs 2 to N 122 are allowed access, while at 950, UE X 124 is barred. At 955, call setup for the high priority call is completed. At 960, the application server 170 updates the priority channel bitmask to allow access to all UEs, since the priority members now have bearers assigned. The application server 170 broadcasts the updated priority channel bitmask, and at 965, UE X 124 is allowed access to the network.

Figure 10:
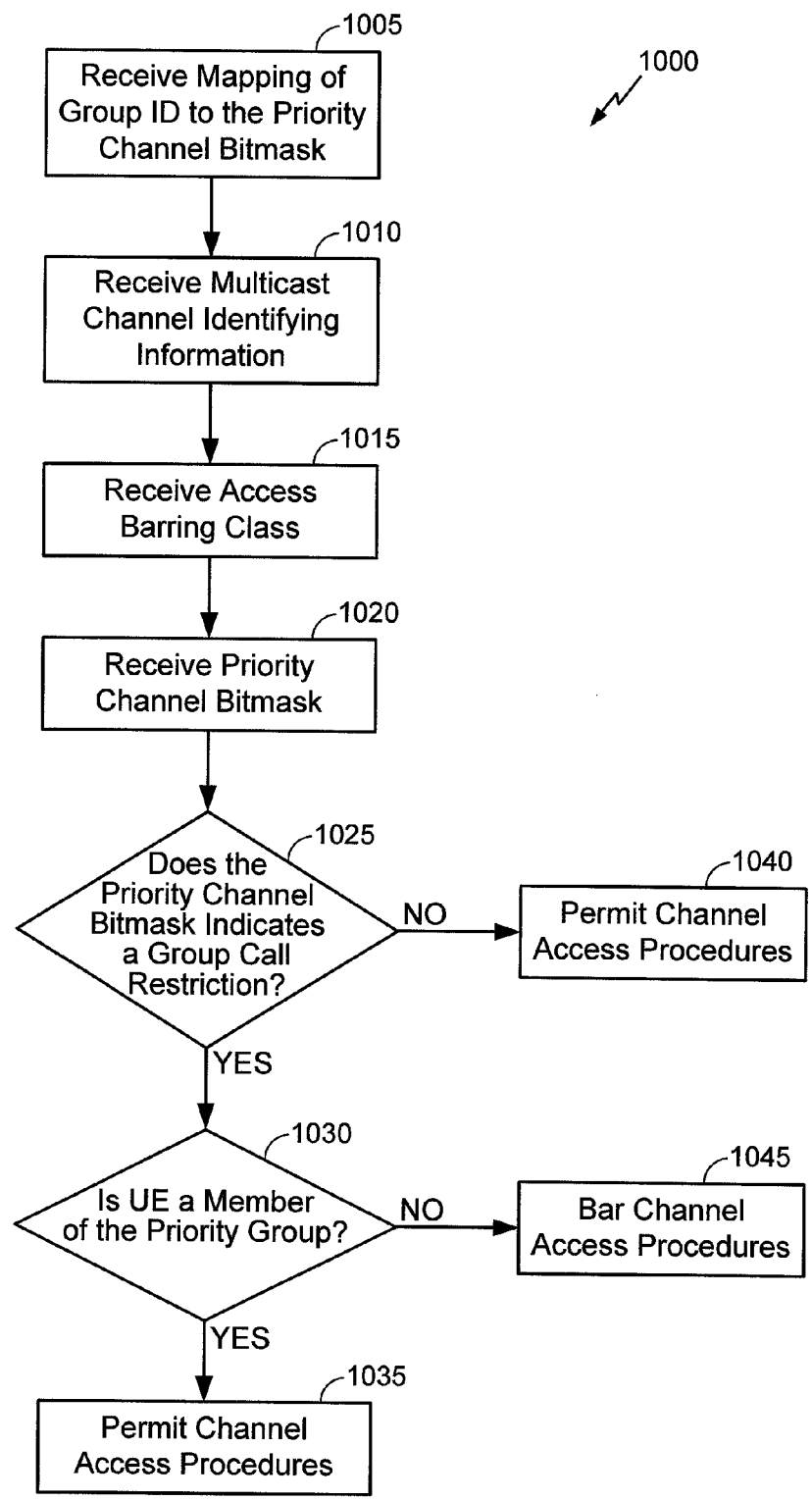
FIG. 10 illustrates an exemplary flow of an aspect of the disclosure performed at a UE.

FIG. 10 illustrates an exemplary flow 1000 of an aspect of the disclosure. At 1005, a UE, such as UE 120, 122, or 124, receives a mapping of its group identifier to the priority channel bitmask. The mapping can be a bitmask with the bit corresponding to the communications group to which the UE belongs set to 1. A communications group may be a group of UEs that can communicate with each other during a group call and/or a group of associated UEs that can receive broadcast/multicast communications intended for that particular group of UEs. Examples of communications groups include a group of family members, a group of employees of a particular company, a group of emergency responders in a particular municipality or geographic area, a group of government employees at a particular agency, a group of military personnel on a particular mission, and/or the like.

At 1010, the UE receives the MTCH identifying information. At 1015, the UE receives the LTE access class. The UE may receive the group identifier mapping, the group identifier bitmask, and the MTCH identifying information from the application server, such as application server 170. Alternatively, a user may assign the LTE access class when initiating a group call. The UE may receive the information at 1005-1015 in one message or several and at the same time or different times.

At 1020, the UE receives the priority channel bitmask from the application server. At 1025, the UE determines whether the priority channel bitmask indicates a priority group call restriction. The priority channel bitmask indicates a priority group call restriction if one of the bits in the bitmask is set to 1. If there is a priority group call restriction, then at 1030, the UE determines whether it is a member of the priority group by comparing its group identifier bitmask to the priority channel bitmask. If the UE's group identifier bitmask matches the priority channel bitmask, then at 1035, the UE permits channel access procedures.

If at 1025, the UE determines that the priority channel bitmask does not indicate a priority group call restriction, then at 1040, the UE permits channel access procedures.

If at 1030, the UE determines that it is not a member of the priority group by comparing its group identifier bitmask to the priority channel bitmask, then at 1045, the UE bars channel access procedures. The barring may be performed regardless of the UE's LTE access class.

The UE may determine a priority level associated with the priority channel bitmask and permit channel access procedures based on the priority level and the UE's LTE access class.

Figure 11:
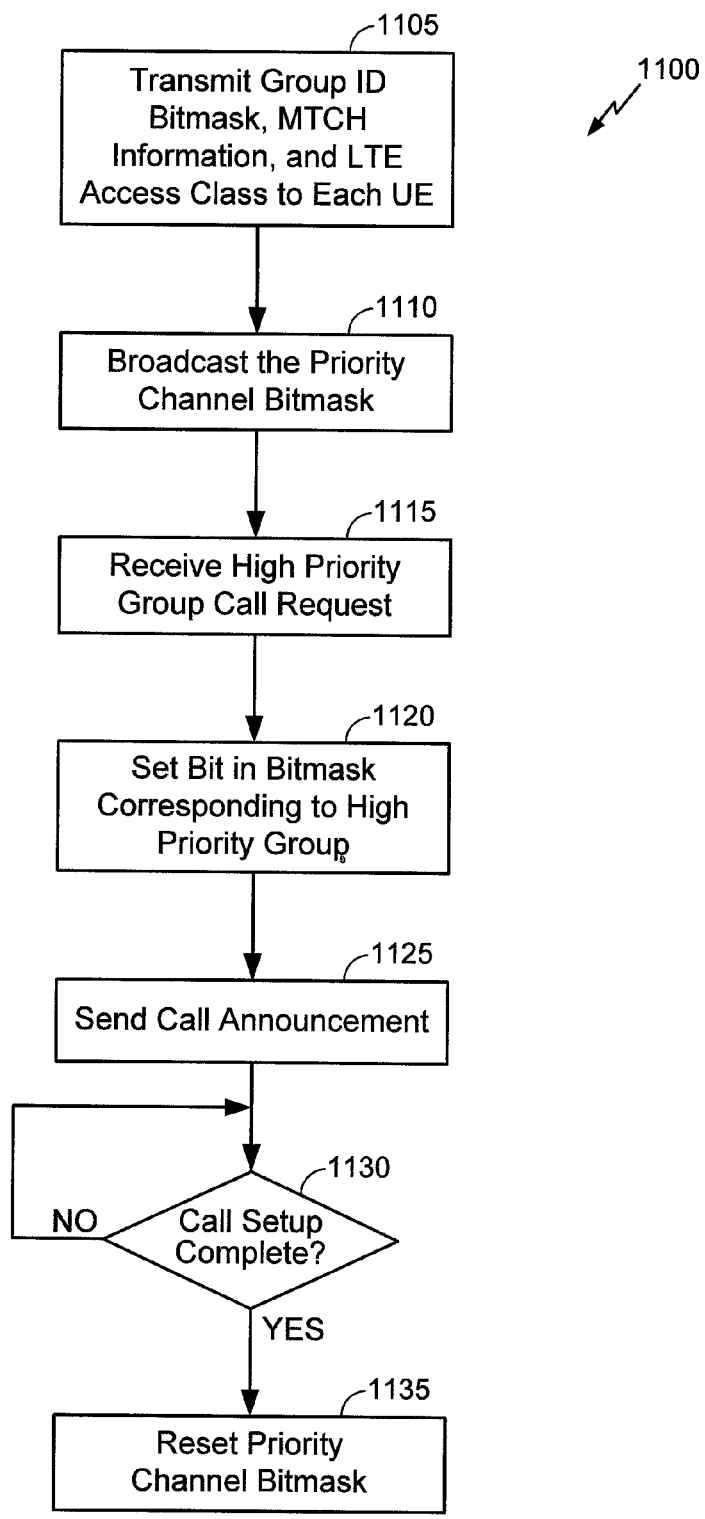
FIG. 11 illustrates an exemplary flow of an aspect of the disclosure performed at an application server.

FIG. 11 illustrates a flow 1100 of an aspect of the disclosure. At 1105, an application server, such as application server 170, transmits a group identifier bitmask, the MTCH information, and the LTE access class to each of the UEs, such as UEs 120, 122, and 124. The application server can transmit this information in one message to each UE or several, and can transmit the one or more messages at the same time or different times. The application server assigns the LTE access class. Alternatively, a user assigns the LTE access barring class when initiating a group call.

At 1110, the application server broadcasts a priority channel bitmask indicating a priority state of one or more communications groups of UEs. If no high priority group calls are being setup, each bit in the bitmask is set to 0. The application server broadcasts the priority channel bitmask periodically.

At 1115, the application server receives a high priority group call request from a member of a high priority communications group of UEs, such as UE 120. At 1120, the application server sets the bit in the priority channel bitmask that corresponds to the high priority group to 1. Because the high priority bitmask prevents UEs from attempting to initiate a group call while a high priority group call is being setup, the application server does not need to check the high priority bitmask to see whether another high priority group call is currently being setup. The application server then broadcasts the updated priority channel bitmask. The application server may broadcast the updated priority channel bitmask immediately or at the next scheduled periodic interval.

At 1125, the application server sends a call announcement to the members of the high priority communications group. At 1130, the application server determines whether call setup is complete. If it is, then at 1135, the application server resets the priority channel bitmask to 0 to allow non-high priority UEs to access the network. If, however, at 1130, call setup is not complete, the application server waits until it is.

Figure 12:
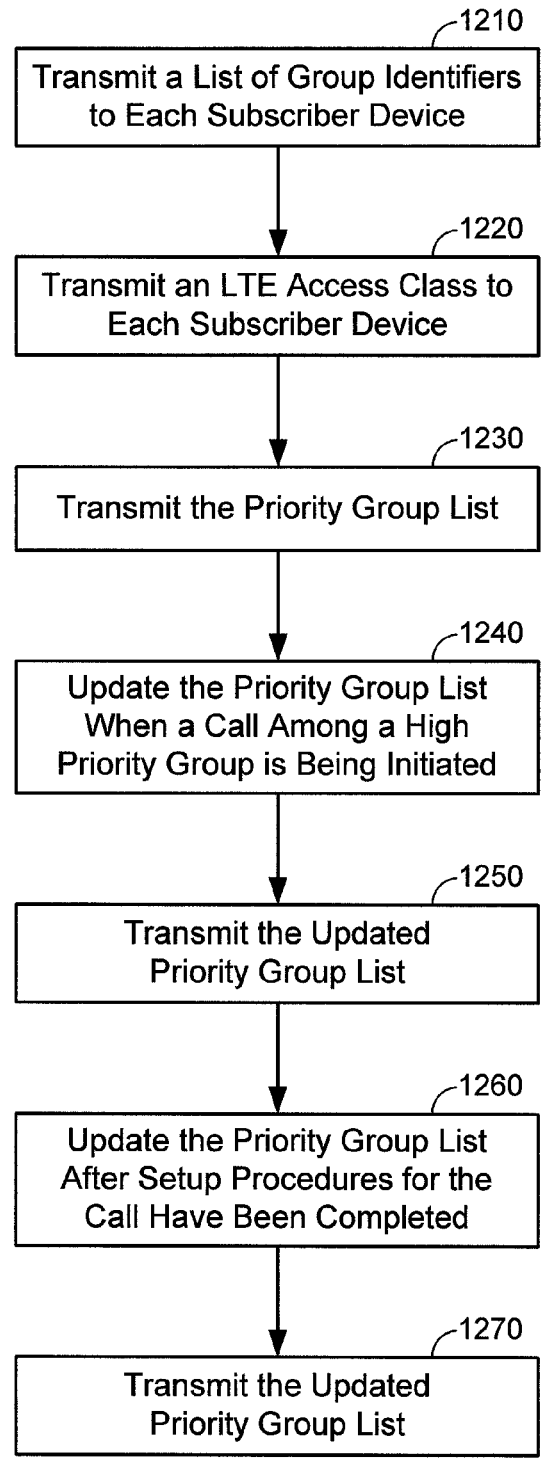
FIG. 12 illustrates an exemplary flow for dynamically controlling access priority to a wireless network for a plurality of subscriber devices for the members of a group call.

FIG. 12 illustrates an exemplary flow for dynamically controlling access priority to a wireless network for a plurality of subscriber devices for the members of a group call. The flow of FIG. 12 may be performed by an application server, such as application server 170.

At 1210, the application server transmits a list of group identifiers to each of the plurality of subscriber devices. The list of group identifiers may be a group identifier bitmask. A list of group identifiers identifies at least one communications group to which a subscriber device belongs.

At 1220, the application server transmits an LTE access class to each of the plurality of subscriber devices. The application server may assign the LTE access class or a user may assign the LTE access barring class when initiating a group call.

At 1230, the application server transmits, on a broadcast/multicast interface, a priority group list indicating a priority state of at least one communications group of subscriber devices. A communications group of subscriber devices may be a group of subscribers that are associated with each other. The broadcast/multicast interface may be an MBMS channel. The broadcast/multicast interface may be an application programming interface (API). A subscriber device will be barred from performing channel access procedures if at least one group identifier of the priority group list does not match at least one group identifier of a list of group identifiers of the subscriber device. The priority group list may be a priority channel bitmask, and the at least one group identifier of the priority group list may be a bit of the priority channel bitmask. The list of group identifiers may be a group identifier bitmask, and the at least one group identifier of the list of group identifiers may be a bit of the group identifier bitmask.

At 1240, the application server updates the priority group list when a call among a high priority group of subscriber devices is being initiated. The application server may update the priority group list by setting a bit assigned to the high priority group in the priority group list to 1. At 1250, the application server transmits the priority group list in response to the updating.

At 1260, the application server updates the priority group list after setup procedures for a call among a high priority group of subscriber devices have been completed. The application server may update the priority group list by setting a bit assigned to the high priority group in the priority group list to 0. At 1270, the application server transmits the priority group list in response to the updating.

Figure 13:
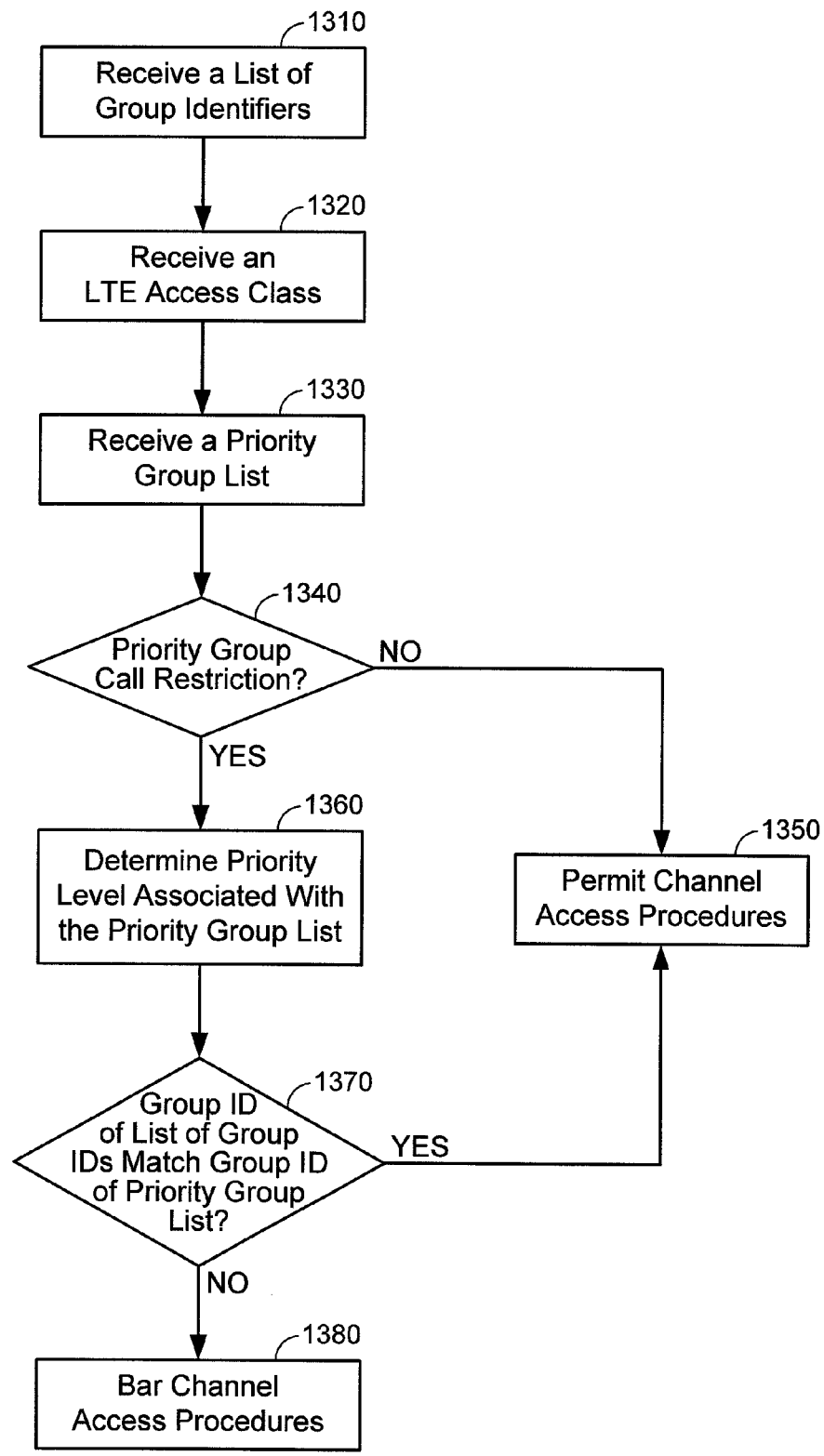
FIG. 13 illustrates an exemplary flow for determining priority access to a wireless network at a subscriber device for a group call.

FIG. 13 illustrates an exemplary flow for determining priority access to a wireless network at a subscriber device for a group call. The flow illustrated in FIG. 12 may be performed by a subscriber device, such as UE 120, 122, 124, 520, 522, 600A, 600B, or 700.

At 1310, the subscriber device receives a list of group identifiers from an application server, such as application server 170. The list of group identifiers identifies at least one communications group to which the subscriber device belongs.

At 1320, the subscriber device receives an LTE access class. An application server, such as application server 170, may assign the LTE access class or a user may assign the LTE access class when initiating a group call. The barring may be performed regardless of the LTE access class.

At 1330, the subscriber device receives, on a broadcast/multicast interface, a priority group list indicating a priority state of at least one communications group of subscriber devices. A communications group of subscriber devices may be a group of subscribers that are associated with each other. The broadcast/multicast interface may be a multimedia broadcast multicast service (MBMS) channel. The list of group identifiers may be a group identifier bitmask, and the at least one group identifier of the list of group identifiers may be a bit of the group identifier bitmask. The priority group list may be a priority channel bitmask, and the at least one group identifier of the priority group list may be a bit of the priority channel bitmask.

At 1340, the subscriber device determines whether or not the priority group list indicates a priority group call restriction. At 1350, if the priority group list does not indicate a priority group call restriction, the subscriber device permits channel access procedures.

At 1360, if the priority group list indicates a priority group call restriction, the subscriber device determines a priority level associated with the priority group list. The subscriber device may permit channel access procedures based on the priority level and the subscriber device's LTE access class.

At 1370, the subscriber device determines whether or not at least one group identifier of the priority group list matches at least one group identifier of the list of group identifiers of the subscriber device. If at least one group identifier of the priority group list matches at least one group identifier of the list of group identifiers, the subscriber device permits channel access procedures at 1350.

At 1380, the subscriber device bars channel access procedures if at least one group identifier of the priority group list does not match at least one group identifier of a list of group identifiers of the subscriber device.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for group communications over evolved multimedia broadcast/multicast services (eMBMS). Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for dynamically controlling access priority to a wireless network for a plurality of subscriber devices for members of a group call, comprising:
   transmitting, on a broadcast/multicast interface, a priority group list indicating a priority state of at least one communications group of subscriber devices, wherein the at least one communications group of subscriber devices comprises a group of subscribers that participate in one or more group calls among the group of subscribers;
   updating the priority group list when a group call among the at least one communications group of subscriber devices is being initiated, wherein a subscriber device belonging to the at least one communications group of subscriber devices does not perform channel access barring procedures when at least one group identifier of the priority group list matches at least one group identifier of a list of group identifiers of the subscriber device; and
   subsequent to the group call among the at least one communications group of subscriber devices being initiated and in response to completion of a group call setup including bearer assignment for each subscriber device in the at least one communications group of subscriber devices, further updating the priority group list to indicate that channel access is available to subscriber devices not included in the at least one communications group of subscriber devices.

2. The method of claim 1, wherein the list of group identifiers comprises a group identifier bitmask, and wherein the at least one group identifier of the list of group identifiers comprises a bit of the group identifier bitmask.

3. The method of claim 1, wherein the priority group list comprises a priority channel bitmask, and wherein the at least one group identifier of the priority group list comprises a bit of the priority channel bitmask.

4. The method of claim 1, wherein the broadcast/multicast interface comprises a multimedia broadcast multicast service (MBMS) channel or an application programming interface (API).

5. The method of claim 1, wherein the at least one communications group of subscriber devices comprises a high priority group of subscriber devices.

6. The method of claim 1, wherein the updating comprises:
   setting a bit assigned to the at least one communications group of subscriber devices in the priority group list to 1.

7. The method of claim 1, further comprising:
   updating the priority group list after setup procedures for the group call among the at least one communications group of subscriber devices have been completed.

8. The method of claim 7, further comprising:
   transmitting the priority group list in response to the updating.

9. The method of claim 7, wherein the updating comprises:
   setting a bit assigned to the at least one communications group of subscriber devices in the priority group list to 0.

10. The method of claim 1, further comprising:
    transmitting a list of group identifiers to each of the plurality of subscriber devices.

11. The method of claim 10, wherein the list of group identifiers identifies the at least one communications group of subscriber devices to which the subscriber device belongs.

12. The method of claim 1, further comprising:
    transmitting a long term evolution (LTE) access class to each of the plurality of subscriber devices.

13. The method of claim 12, wherein an application server assigns the LTE access class or a user assigns the LTE access class when initiating the group call among the at least one communications group of subscriber devices.

14. A method for determining priority access to a wireless network at a subscriber device for a group call, comprising:
    receiving, on a broadcast/multicast interface, a priority group list indicating a priority state of at least one communications group of subscriber devices, wherein the at least one communications group of subscriber devices comprises a group of subscribers that participate in one or more group calls among the group of subscribers;
    receiving a first update of the priority group list when a group call among the at least one communications group of subscriber devices is being initiated;
    barring channel access procedures when at least one group identifier of the first update of the priority group list does not match at least one group identifier of a list of group identifiers of the subscriber device; and
    subsequent to the group call among the at least one communications group of subscriber devices being initiated and in response to completion of a group call setup including bearer assignment for each subscriber device in the at least one communications group of subscriber devices, receiving a second update of the priority group list that indicates that channel access is available to subscriber devices not included in the at least one communications group of subscriber devices.

15. The method of claim 14, wherein the broadcast/multicast interface comprises a multimedia broadcast multicast service (MBMS) channel.

16. The method of claim 14, wherein the list of group identifiers comprises a group identifier bitmask, and wherein the at least one group identifier of the list of group identifiers comprises a bit of the group identifier bitmask.

17. The method of claim 14, wherein the priority group list comprises a priority channel bitmask, and wherein the at least one group identifier of the priority group list comprises a bit of the priority channel bitmask.

18. The method of claim 14, wherein the barring comprises:
    determining whether or not the priority group list indicates a priority group call restriction.

19. The method of claim 18, further comprising:
    determining whether or not the at least one group identifier of the priority group list matches the at least one group identifier of the list of group identifiers of the subscriber device when the priority group list indicates the priority group call restriction.

20. The method of claim 19, further comprising:
    permitting the channel access procedures when the at least one group identifier of the priority group list matches the at least one group identifier of the list of group identifiers.

21. The method of claim 20, further comprising:
determining a priority level associated with the priority group list,
wherein permitting the channel access procedures is based on the priority level and the subscriber device's long term evolution (LTE) access class.

22. The method of claim 18, further comprising:
permitting the channel access procedures when the priority group list does not indicate a priority group call restriction.

23. The method of claim 14, further comprising:
receiving a long term evolution (LTE) access class.

24. The method of claim 23, wherein an application server assigns the LTE access class or a user assigns the LTE access class when initiating the group call among the at least one communications group of subscriber devices.

25. The method of claim 23, wherein the barring is performed regardless of the LTE access class.

26. The method of claim 14, further comprising: receiving the list of group identifiers from an application server.

27. The method of claim 14, wherein the list of group identifiers identifies at least one communications group to which the subscriber device belongs.

28. An apparatus for dynamically controlling access priority to a wireless network for a plurality of subscriber devices for members of a group call, comprising:
a communications interface configured to transmit, on a broadcast/multicast interface, a priority group list indicating a priority state of at least one communications group of subscriber devices, wherein the at least one communications group of subscriber devices comprises a group of subscribers that participate in one or more group calls among the group of subscribers; and
at least one processor configured to:
update the priority group list when a group call among the at least one communications group of subscriber devices is being initiated, wherein a subscriber device belonging to the at least one communications group of subscriber devices does not perform channel access barring procedures when at least one group identifier of the priority group list matches at least one group identifier of a list of group identifiers of the subscriber device; and
further update, subsequent to the group call among the at least one communications group of subscriber devices being initiated and in response to completion of a group call setup including bearer assignment for each subscriber device in the at least one communications group of subscriber devices, the priority group list to indicate that channel access is available to subscriber devices not included in the at least one communications group of subscriber devices.

29. The apparatus of claim 28, wherein the list of group identifiers comprises a group identifier bitmask, and wherein the at least one group identifier of the list of group identifiers comprises a bit of the group identifier bitmask.

30. The apparatus of claim 28, wherein the priority group list comprises a priority channel bitmask, and wherein the at least one group identifier of the priority group list comprises a bit of the priority channel bitmask.

31. The apparatus of claim 28, wherein the broadcast/multicast interface comprises a multimedia broadcast multicast service (MBMS) channel.

32. The apparatus of claim 28, wherein the broadcast/multicast interface comprises an application programming interface (API).

33. The apparatus of claim 28, wherein the at least one communications group of subscriber devices comprises a high priority group of subscriber devices.

34. The apparatus of claim 28, wherein the at least one processor being configured to update comprises the at least one processor being configured to:
set a bit assigned to the at least one communications group of subscriber devices in the priority group list to 1.

35. The apparatus of claim 28, wherein the at least one processor is further configured to:
update the priority group list after setup procedures for the group call among the at least one communications group of subscriber devices have been completed.

36. The apparatus of claim 35, wherein the communications interface is further configured to:
transmit the priority group list in response to the update after the setup procedures have been completed.

37. The apparatus of claim 35, wherein the at least one processor being configured to update comprises the at least one processor being configured to:
set a bit assigned to the high priority group of subscriber devices in the priority group list to 0.

38. The apparatus of claim 28, wherein the communications interface is further configured to:
transmit a list of group identifiers to each of the plurality of subscriber devices.

39. The apparatus of claim 38, wherein the list of group identifiers identifies at least one communications group to which the subscriber device belongs.

40. The apparatus of claim 28, wherein the communications interface is further configured to:
transmit a long term evolution (LTE) access class to each of the plurality of subscriber devices.

41. The apparatus of claim 40, wherein an application server assigns the LTE access class or a user assigns the LTE access class when initiating the group call among the at least one communications group of subscriber devices.

42. An apparatus for determining priority access to a wireless network at a subscriber device for a group call, comprising:
a transceiver configured to receive, on a broadcast/multicast interface, a priority group list indicating a priority state of at least one communications group of subscriber devices, wherein the at least one communications group of subscriber devices comprises a group of subscribers that participate in one or more group calls among the group of subscribers;
the transceiver further configured to receive a first update of the priority group list when a group call among the at least one communications group of subscriber devices is being initiated; and
at least one processor configured to bar channel access procedures when at least one group identifier of the first update of the priority group list does not match at least one group identifier of a list of group identifiers of the subscriber device,
wherein the transceiver is further configured to receive, subsequent to the group call among the at least one communications group of subscriber devices being initiated and in response to completion of a group call setup including bearer assignment for each subscriber device in the at least one communications group of subscriber devices, a second update of the priority group list that indicates that channel access is available to subscriber devices not included in the at least one communications group of subscriber devices.

43. The apparatus of claim 42, wherein the broadcast/multicast interface comprises a multimedia broadcast multicast service (MBMS) channel.

44. The apparatus of claim 42, wherein the list of group identifiers comprises a group identifier bitmask, and wherein the at least one group identifier of the list of group identifiers comprises a bit of the group identifier bitmask.

45. The apparatus of claim 42, wherein the priority group list comprises a priority channel bitmask, and wherein the at least one group identifier of the priority group list comprises a bit of the priority channel bitmask.

46. The apparatus of claim 42, wherein the at least one processor being configured to bar comprises the at least one processor being configured to:
determine whether or not the priority group list indicates a priority group call restriction.

47. The apparatus of claim 46, wherein the at least one processor is further configured to:
determine whether or not the at least one group identifier of the priority group list matches the at least one group identifier of the list of group identifiers of the subscriber device when the priority group list indicates the priority group call restriction.

48. The apparatus of claim 47, wherein the at least one processor is further configured to:
permit channel access procedures when the at least one group identifier of the priority group list matches the at least one group identifier of the list of group identifiers.

49. The apparatus of claim 48, wherein the at least one processor is further configured to:
determine a priority level associated with the priority group list,
wherein the channel access procedures being permitted is based on the priority level and the subscriber device's long term evolution (LTE) access class.

50. The apparatus of claim 47, wherein the at least one processor is further configured to:
permit the channel access procedures when the priority group list does not indicate a priority group call restriction.

51. The apparatus of claim 42, wherein the transceiver is further configured to:
receive a long term evolution (LTE) access class.

52. The apparatus of claim 51, wherein an application server assigns the LTE access class or a user assigns the LTE access class when initiating the group call among the at least one communications group of subscriber devices.

53. The apparatus of claim 51, wherein the at least one processor bars the channel access procedures regardless of the LTE access class.

54. The apparatus of claim 42, wherein the transceiver is further configured to:
receive the list of group identifiers from an application server.

55. The apparatus of claim 42, wherein the list of group identifiers identifies at least one communications group to which the subscriber device belongs.

56. An apparatus for dynamically controlling access priority to a wireless network for a plurality of subscriber devices for members of a group call, comprising:
means for transmitting, on a broadcast/multicast interface, a priority group list indicating a priority state of at least one communications group of subscriber devices, wherein the at least one communications group of subscriber devices comprises a group of subscribers that participate in one or more group calls among the group of subscribers;

means for updating the priority group list when a group call among the at least one communications group of subscriber devices is being initiated, wherein a subscriber device belonging to the at least one communications group of subscriber devices does not perform channel access barring procedures when at least one group identifier of the priority group list matches at least one group identifier of a list of group identifiers of the subscriber device; and means for further updating, subsequent to the group call among the at least one communications group of subscriber devices being initiated and in response to completion of a group call setup including bearer assignment for each subscriber device in the at least one communications group of subscriber devices, the priority group list to indicate that channel access is available to subscriber devices not included in the at least one communications group of subscriber devices.

57. An apparatus for determining priority access to a wireless network at a subscriber device for a group call, comprising:
means for receiving, on a broadcast/multicast interface, a priority group list indicating a priority state of at least one communications group of subscriber devices, wherein the at least one communications group of subscriber devices comprises a group of subscribers that participate in one or more group calls among the group of subscribers;

means for receiving a first update of the priority group list when a group call among the at least one communications group of subscriber devices is being initiated;

means for barring channel access procedures when at least one group identifier of the first update of the priority group list does not match at least one group identifier of a list of group identifiers of the subscriber device; and means for receiving, subsequent to the group call among the at least one communications group of subscriber devices being initiated and in response to completion of a group call setup including bearer assignment for each subscriber device in the at least one communications group of subscriber devices, a second update of the priority group list that indicates that channel access is available to subscriber devices not included in the at least one communications group of subscriber devices.

58. A non-transitory computer-readable medium for dynamically controlling access priority to a wireless network for a plurality of subscriber devices for members of a group call, comprising:
at least one instruction to transmit, on a broadcast/multicast interface, a priority group list indicating a priority state of at least one communications group of subscriber devices, wherein the at least one communications group of subscriber devices comprises a group of subscribers that participate in one or more group calls among the group of subscribers;

at least one instruction to update the priority group list when a group call among the at least one communications group of subscriber devices is being initiated, wherein a subscriber device belonging to the at least one communications group of subscriber devices does not perform channel access barring procedures when at least one group identifier of the priority group list matches at least one group identifier of a list of group identifiers of the subscriber device; and at least one instruction to further update, subsequent to the group call among the at least one communications group of subscriber devices being initiated and in response to completion of a group call setup including bearer assignment for each subscriber device in the at least one communications group of subscriber devices, the priority group list to indicate that channel access is available to subscriber devices not included in the at least one communications group of subscriber devices.

59. A non-transitory computer-readable medium for determining priority access to a wireless network at a subscriber device for a group call, comprising:
- at least one instruction to receive, on a broadcast/multicast interface, a priority group list indicating a priority state of at least one communications group of subscriber devices, wherein the at least one communications group of subscriber devices comprises a group of subscribers that participate in one or more group calls among the group of subscribers;
- at least one instruction to receive an updated priority group list when a group call among the at least one communications group of subscriber devices is being initiated;
- at least one instruction to bar channel access procedures when at least one group identifier of the priority group list does not match at least one group identifier of a list of group identifiers of the subscriber device; and
- at least one instruction to receive, subsequent to the group call among the at least one communications group of subscriber devices being initiated and in response to completion of a group call setup including bearer assignment for each subscriber device in the at least one communications group of subscriber devices, a second update of the priority group list that indicates that channel access is available to subscriber devices not included in the at least one communications group of subscriber devices.

60. The method of claim 1, wherein the group call among the at least one communications group of subscriber devices is a group call among a first communication group of subscriber devices, wherein a second subscriber device belonging to the first communication group of subscriber devices is barred from channel access when no group identifier of the priority group list matches any group identifier of a second list of group identifiers of the second subscriber device.

* * * * *